United States Patent
Li et al.

(10) Patent No.: US 9,209,913 B2
(45) Date of Patent: Dec. 8, 2015

(54) TEMPERATURE COMPENSATION METHOD AND APPARATUS FOR RECEIVED SIGNAL STRENGTH INDICATOR

(71) Applicant: FUJITSU LIMITED, Kawasaki-shi, Kanagawa (JP)

(72) Inventors: Hui Li, Beijing (CN); Takanori Iwamatsu, Kawasaki (JP); Jianmin Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 103 days.

(21) Appl. No.: 14/040,228

(22) Filed: Sep. 27, 2013

(65) Prior Publication Data
US 2014/0094133 A1   Apr. 3, 2014

(30) Foreign Application Priority Data
Sep. 28, 2012 (CN) .......................... 2012 1 0371377

(51) Int. Cl.
| | |
|---|---|
| H04B 1/16 | (2006.01) |
| H04B 17/21 | (2015.01) |
| H04B 17/00 | (2015.01) |
| H04B 17/318 | (2015.01) |

(52) U.S. Cl.
CPC ............ *H04B 17/0062* (2013.01); *H04B 17/21* (2015.01); *H04B 17/318* (2015.01)

(58) Field of Classification Search
USPC ..................................... 455/226.2, 232.1, 230
See application file for complete search history.

(56) References Cited

U.S. PATENT DOCUMENTS

| | | | | |
|---|---|---|---|---|
| 4,578,820 | A * | 3/1986 | Highton ..................... | 455/226.2 |
| 5,697,081 | A * | 12/1997 | Lyall et al. ................. | 455/249.1 |
| 6,546,234 | B2 * | 4/2003 | Choe et al. ................. | 455/226.2 |
| 7,245,893 | B1 * | 7/2007 | Husted et al. .............. | 455/226.3 |

FOREIGN PATENT DOCUMENTS

JP   09261100 A   * 10/1997

* cited by examiner

*Primary Examiner* — Blane J Jackson
(74) *Attorney, Agent, or Firm* — Arent Fox LLP

(57) ABSTRACT

Embodiments of the present invention provide a temperature compensation method and apparatus for a received signal strength indicator. The apparatus comprises a temperature sensor configured to measure a current temperature; and a digital compensation module configured to select a temperature compensation coefficient from prestored temperature compensation coefficients corresponding to a normal temperature, a low temperature and a high temperature according to the current temperature, and perform temperature compensation on output signals of the RSSI according to the selected temperature compensation coefficient. With the method and apparatus of the embodiments of the present invention, the accurate power values of the input signals of the RSSI under any temperatures can be obtained by measuring the characteristics of the RSSI under the predefined three temperatures, and using an interpolation method to compensate for the temperature characteristics of the RSSI. In comparison with the relevant art, the size of the storage is decreased and the accuracy of temperature compensation is improved.

19 Claims, 5 Drawing Sheets

TEMPERATURE COMPENSATION METHOD AND APPARATUS FOR RECEIVED SIGNAL STRENGTH INDICATOR

CROSS-REFERENCE TO RELATED APPLICATION

This application is based upon and claims the benefit of priority of the Chinese Patent Application No. 201210371377.9, filed Sep. 28, 2012, the disclosure of the prior application of which is hereby incorporated in its entirety by reference.

TECHNICAL FIELD

The present invention relates to the field of temperature compensation and, in particular to a temperature compensation method and apparatus for a Received Signal Strength Indicator (RSSI) for compensating for temperature characteristics of the RSSI in using the RSSI for power measurement.

BACKGROUND ART

RSSI is widely used in power measurement of signals. However, variation of ambient temperature will have effect on the characteristics of the RSSI, resulting in inaccuracy of the power measurement result. When the ambient temperature varies, temperature characteristics of the RSSI need to be compensated, so as to ensure accuracy of the power measurement result of the RSSI.

Existing temperature compensation methods may be divided into three classes. The most widely used method is to store RSSI temperature compensation values under various temperatures, and select a corresponding temperature compensation value for compensation according to current temperature. Another class of method is to use an analog device inverse to the RSSI temperature characteristics for compensation. And a third class of method is to increase training signal transmission branches, so as to periodically calibrate the RSSI. All of these methods increase the complexity of hardware.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY OF THE INVENTION

An object of the embodiments of the present invention is to provide a temperature compensation method and apparatus for a received signal strength indicator, so as to improve accuracy of temperature compensation.

According to an aspect of the embodiments of the present invention, there is provided a temperature compensation apparatus for an RSSI, comprising:

a temperature sensor configured to measure a current temperature; and a digital compensation module configured to select a temperature compensation coefficient from prestored temperature compensation coefficients corresponding to a normal temperature, a low temperature and a high temperature according to the current temperature, and perform temperature compensation on output signals of the RSSI according to the selected temperature compensation coefficient.

According to another aspect of the embodiments of the present invention, there is provided electronic equipment, comprising the temperature compensation apparatus as described above, and temperature compensation being performed by the temperature compensation apparatus on output signals of an RSSI when the signal power of the electronic equipment is measured.

According to still another aspect of the embodiments of the present invention, there is provided electronic equipment, comprising the temperature compensation apparatus as described above, a calculation module and a storage module, and temperature compensation being performed by the temperature compensation apparatus on output signals of an RSSI when the signal power of the electronic equipment is measured.

According to still another aspect of the embodiments of the present invention, there is provided a temperature compensation method for an RSSI, comprising:

measuring a current temperature;

selecting a temperature compensation coefficient from prestored temperature compensation coefficients corresponding to a normal temperature, a low temperature and a high temperature according to the current temperature;

calculating an inverse RSSI characteristic difference according to the selected temperature compensation coefficient and the output signals of the RSSI; and calculating inverse RSSI characteristics according to the inverse RSSI characteristic difference, the output signals of the RSSI and a normal temperature coefficient.

The advantages of the embodiments of the present invention exist in that accurate power values of an input signal under any temperature may be obtained by measuring characteristics of an RSSI under three temperatures and using an interpolation method to compensate for the temperature characteristics of the RSSI. In comparison with the relevant art, the size of the storage is decreased and accuracy of temperature compensation is improved.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the present invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be enlarged or reduced. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

In the drawings.

DETAILED DESCRIPTION OF THE INVENTION

The foregoing and other features of the embodiments of the present invention will become apparent with reference to the drawings and the following description. These embodiments are illustrative only and are not intended to limit the present invention. For easy understanding of the principle and embodiment of the present invention by those skilled in the art, the principle of the embodiments of the present invention shall be described taking a scenario of temperature compensation where an RSSI is used for power measurement as an example. However, it should be understood that the embodiments of the present invention are not limited to such a scenario, and it applicable to other scenarios of temperature compensation relating to power measurement.

The preferred embodiments of the present invention are described as follows with reference to the drawings.

Embodiment 1

Figure 1:
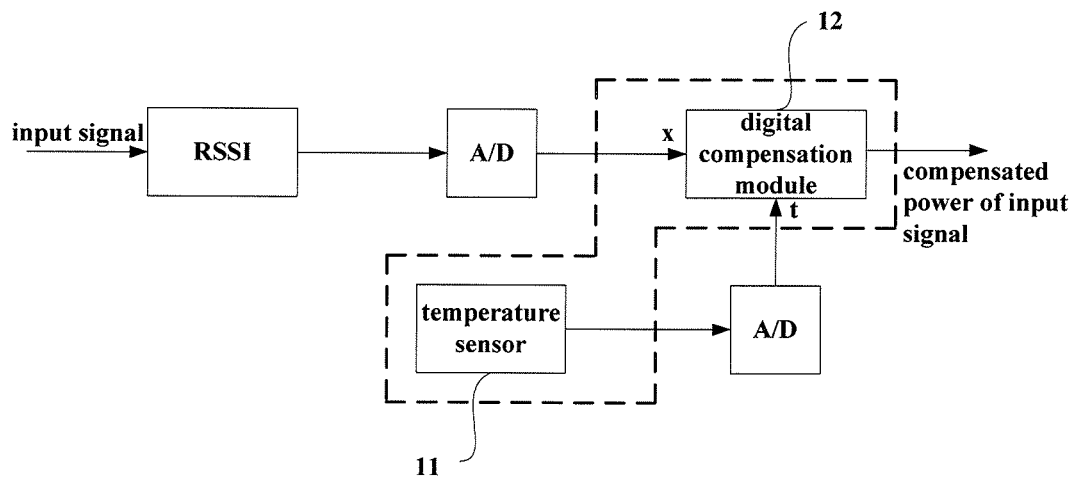
FIG. 1 is a schematic diagram of the composition of a temperature compensation apparatus of an embodiment of the present invention.

An embodiment of the present invention provides a temperature compensation apparatus for an RSSI. FIG. 1 is a schematic diagram of the composition of the temperature compensation apparatus. As shown in FIG. 1, the apparatus comprises:

a temperature sensor 11 configured to measure a current temperature; and a digital compensation module 12 configured to select a temperature compensation coefficient from prestored temperature compensation coefficients corresponding to a normal temperature, a low temperature and a high temperature according to the current temperature, and perform temperature compensation on output signals of the RSSI according to the selected temperature compensation coefficient, thereby obtaining power of input signals of the RSSI.

As shown in FIG. 1, digital signals x are obtained after the output signals of the RSSI are converted by an A/D converter, and are inputted into the digital compensation module 12 thereafter. The temperature sensor 11 (such as an analog temperature sensor) measures a current ambient temperature, and uses an A/D converter to obtain a digital temperature value t. The digital compensation module 12 performs temperature compensation on input signals x according to the current temperature t, and obtains and outputs accurate power values of the input signals.

In the following description, "output signals of RSSI" refer to digital signals x having been converted by an A/D converter, and "current temperature" refers to a digital temperature value t obtained through an A/D converter, unless otherwise specified.

In an embodiment, the temperature compensation coefficients corresponding to a normal temperature, a low temperature and a high temperature may be obtained by measuring RSSI characteristics under a normal temperature, a low temperature and a high temperature in advance, and then fitting inverse RSSI characteristics under these temperatures by using a polynomial. That is, RSSI characteristics under the three temperatures (the normal temperature t0; the high temperature th, which may be the maximum temperature of the work environment of the RSSI; and the low temperature t1, which may be the minimum temperature of the work environment of the RSSI) are measured first, and then a polynomial is used for fitting according to the RSSI characteristics under the three temperatures obtained by measurement, so as to obtain three group of temperature compensation coefficients. These temperature compensation coefficients may be stored in a storage of the digital compensation module 12, and may also be stored in an external storage. However, this embodiment is not limited thereto. A detailed process of calculating temperature compensation coefficients shall be described below.

Figure 2:
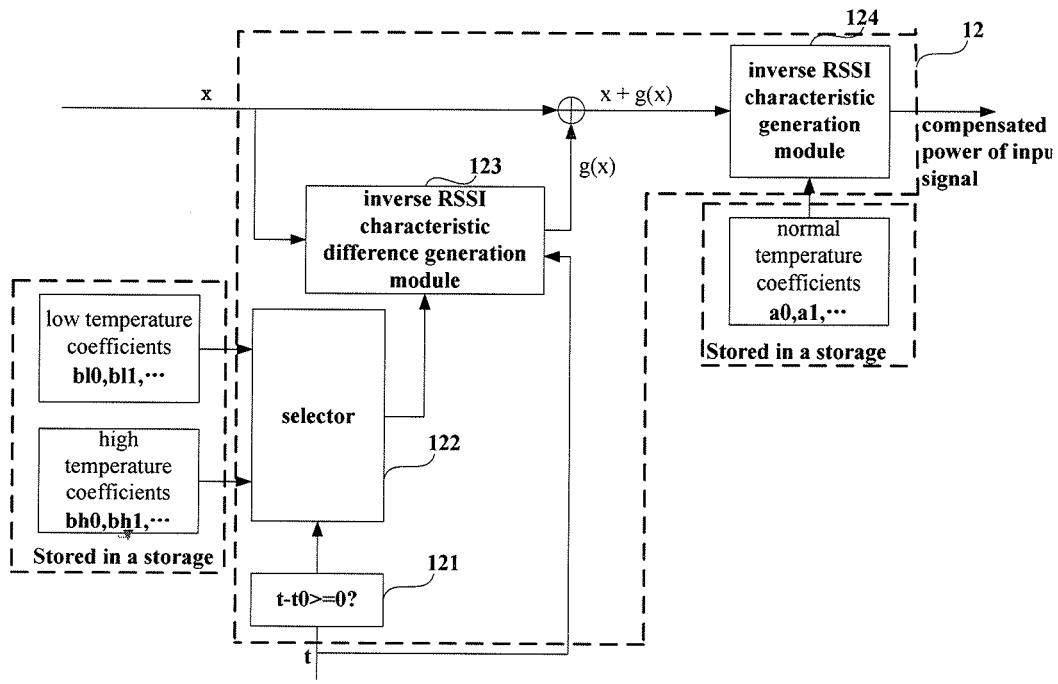
FIG. 2 is a schematic diagram of the composition of a temperature compensation module of the temperature compensation apparatus of the embodiment of the present invention.

In an embodiment, the digital compensation module 12 comprises a comparator 121, a selector 122, an inverse RSSI characteristic difference generation module 123 and an inverse RSSI characteristic generation module 124, as shown in FIG. 2.

In this embodiment, the comparator 121 is configured to compare the current temperature t with the normal temperature t0;

wherein the current temperature t is obtained by the temperature sensor 11 through measurement, and the values of the normal temperature t0, the high temperature th and the low temperature t1 may be predefined according to the operational characteristics of the input signals of the RSSI, as described above, and this embodiment is not limited thereto.

In this embodiment, the selector 122 is configured to select a high temperature coefficient or a low temperature coefficient as the temperature compensation coefficient of the inverse RSSI characteristic difference generation module 123 according to the comparison result of the comparator 121;

wherein if the current temperature is higher than the normal temperature, i.e. t−t0≥0, the selector 122 takes high temperature compensation coefficients bh0, bh1, . . . as the temperature compensation coefficients and provides them to the inverse RSSI characteristic difference generation module 123; and if the current temperature is lower than the normal temperature, i.e. t−t0<0, the selector 122 takes low temperature compensation coefficients bl0, bl1, . . . as the temperature compensation coefficients and provides them to the inverse RSSI characteristic difference generation module 123;

wherein the high temperature compensation coefficients bh0, bh1, ..., the low temperature compensation coefficients bl0, bl1, ... and the normal temperature compensation coefficients a0, a1, ... are prestored in a storage, which may be a storage of the digital compensation module 12, and may also be an external storage.

Figure 3:
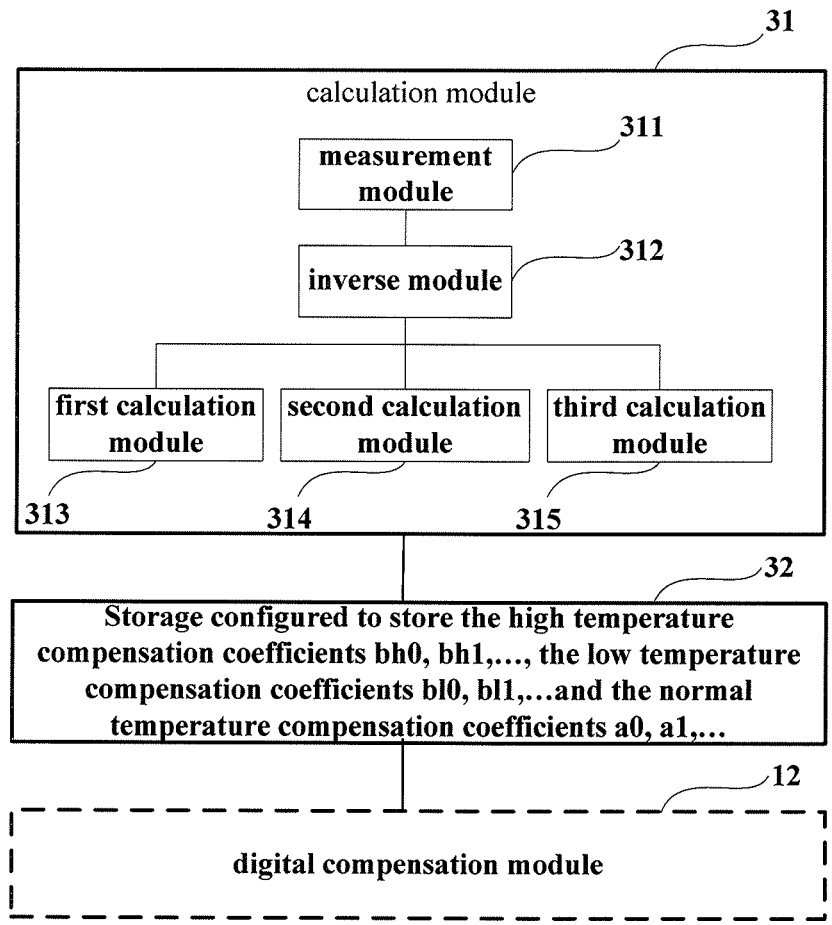
FIG. 3 is a schematic diagram of the compositions of a calculation module and a storage of the temperature compensation apparatus of the embodiment of the present invention.

As in FIG. 3, in an implementation of the embodiment, the temperature compensation apparatus further comprises a calculation module 31 and a storage 32 for respectively calculating and storing the high temperature compensation coefficients, the low temperature compensation coefficients and the normal temperature compensation coefficients; wherein, the calculation module 31 is configured to calculate the normal temperature coefficients a0, a1, a2 ... to which the RSSI characteristics under the predefined normal temperature t0 correspond, the low temperature coefficients bl0, bl1, bl2 ... to which the RSSI characteristics under the predefined low temperature t1 correspond, and the high temperature coefficients bh0, bh1, bh2 ... to which the RSSI characteristics under the predefined high temperature th correspond; and the storage 32 is configured to store the normal temperature coefficients a0, a1, a2 ..., the low temperature coefficients bl0, bl1, bl2 ..., and the high temperature coefficients bh0, bh1, bh2 ....

In this implementation, the calculation module 31 may comprise a measurement module 311, an inverse module 312, a first calculation module 313, a second calculation module 314 and a third calculation module 315; wherein, the measurement module 311 is configured to respectively measure RSSI characteristics under the normal temperature t0, the low temperature t1 and the high temperature th; wherein the characteristics are relations between input power and output voltages;

the inverse module 312 is configured to take inverses of the RSSI characteristics under different temperatures; wherein the inverse RSSI characteristics under the three temperatures may be obtained by directly exchanging the inputs and output of the above RSSI characteristics;

the first calculation module 313 is configured to perform polynomial fitting on the inverse RSSI characteristics under the normal temperature t0, so as to obtain the normal temperature coefficients a0, a1, a2 ... to which the RSSI characteristics under the normal temperature correspond; wherein the inverse RSSI characteristics under the normal temperature t0 are fitted by using a polynomial, and then the normal temperature coefficients a0, a1, a2 ... may be obtained by using a least squares (LS) algorithm;

the second calculation module 314 is configured to perform polynomial fitting on the difference between the inverse RSSI characteristics under the normal temperature t0 and the high temperature th, so as to obtain the high temperature coefficients bh0, bh1, bh2 ... to which the RSSI characteristics under the high temperature correspond; wherein, the high temperature coefficients bh0, bh1, ... may be obtained by first calculating a difference between the inverse RSSI characteristics under the normal temperature t0 and the inverse RSSI characteristics under the high temperature th, that is, the inverse RSSI characteristics under the normal temperature t0 minus the inverse RSSI characteristics under the high temperature th, and then using a polynomial to fit the difference, and using an LS algorithm;

and the third calculation module 315 is configured to perform polynomial fitting on the difference between the inverse RSSI characteristics under the normal temperature t0 and the low temperature t1, so as to obtain the low temperature coefficients bl0, bl1, bl2 ... to which the RSSI characteristics under the low temperature correspond; wherein, the low temperature coefficients bl0, bl1, ... may be obtained by first calculating a difference between the inverse RSSI characteristics under the normal temperature t0 and the inverse RSSI characteristics under the low temperature t1, that is, the inverse RSSI characteristics under the normal temperature t0 minus the inverse RSSI characteristics under the low temperature t1, and then using a polynomial to fit the difference, and using an LS algorithm.

In this implementation, a common polynomial or an orthogonal polynomial may be used as the above polynomial. The number of the temperature compensation coefficients is decided by the number of the orders of the used polynomial. The number of the temperature compensation coefficients under the three temperatures may be identical or different.

In this implementation, the calculation module 31 and the storage 32 are outside the digital compensation module 12. However, this embodiment is not limited thereto. In another embodiment, the calculation module 31 and the storage 32 may be in the digital compensation module 12, instead of being parts of the digital compensation module 12. In other embodiments, the calculation module 31 may only be taken as a part of the digital compensation module 12, and the storage 32 is out of the digital compensation module 12. In this case, the digital compensation module 12 selects a corresponding temperature compensation coefficient from the storage 32 according to current temperature obtained by the temperature sensor 11 through measurement. What is described above is illustrative only, and in particularly carrying out the temperature compensation apparatus of the embodiment of the present invention, the calculation module 31 and the storage 32 may be arranged in various ways according to the technical idea of the present invention, with the contents of which being covered by the protection scope of the present invention.

In this embodiment, the inverse RSSI characteristic difference generation module 123 is configured to calculate an inverse RSSI characteristic difference according to the temperature compensation coefficient selected by the selector 122 and the output signals of the RSSI.

In one implementation of the embodiment, if t−t0<0, as the selector 122 selects a low temperature compensation coefficient, the inverse RSSI characteristic difference generation module 123 may calculate the inverse RSSI characteristic difference g(x) of the output signals of the RSSI according to the formula below:

$$g(x)=(t-t0)*(bl0+bl1*x+bl2*x^2+\dots).$$

In another implementation of the embodiment, if t−t0≥0, as the selector 122 selects a high temperature compensation coefficient, the inverse RSSI characteristic difference generation module 123 may calculate the inverse RSSI characteristic difference g(x) of the output signals of the RSSI according to the formula below:

$$g(x)=(t-t0)*(bh0+bh1*x+bh2*x^2+\dots).$$

Referring to FIG. 2, the temperature characteristic difference of the current temperature t relative to the normal temperature t0 may be compensated by adding up the output signal g(x) of the inverse RSSI characteristic difference generation module and the input signal x; and the compensated value, that is, the result of addition g(x)+x, may be taken as the input of the inverse RSSI characteristic generation module 124.

In this embodiment, the inverse RSSI characteristic generation module 124 is configured to calculate inverse RSSI characteristics under the normal temperature according to the inverse RSSI characteristic difference g(x), the output signals x of the RSSI and the normal temperature coefficient.

In an implementation of the embodiment, the inverse RSSI characteristic difference g(x) and the output signal x of the RSSI are taken as the input of the inverse RSSI characteristic generation module 124, and the inverse RSSI characteristic generation module 124 may calculate the inverse RSSI characteristics f(x+g(x)) under the normal temperature according to the formula below:

$$f(x+g(x))=a0+a1*(x+g(x))+a2*(x+g(x))^2+\ldots$$

In this implementation, as the temperature characteristic difference of the current temperature relative to the normal temperature is compensated, the output signal f(x+g(x)) of the inverse RSSI characteristic generation module 124 is an accurate power value of the input signal of the RSSI.

The temperature compensation apparatus of this embodiment obtains accurate power values of the input signals of the RSSI under any temperatures by measuring the characteristics of the RSSI under the predefined three temperatures, and using an interpolation method to compensate for the temperature characteristics of the RSSI. In comparison with the relevant art, the size of the storage is decreased and the accuracy of temperature compensation is improved.

Embodiment 2

Figure 4:
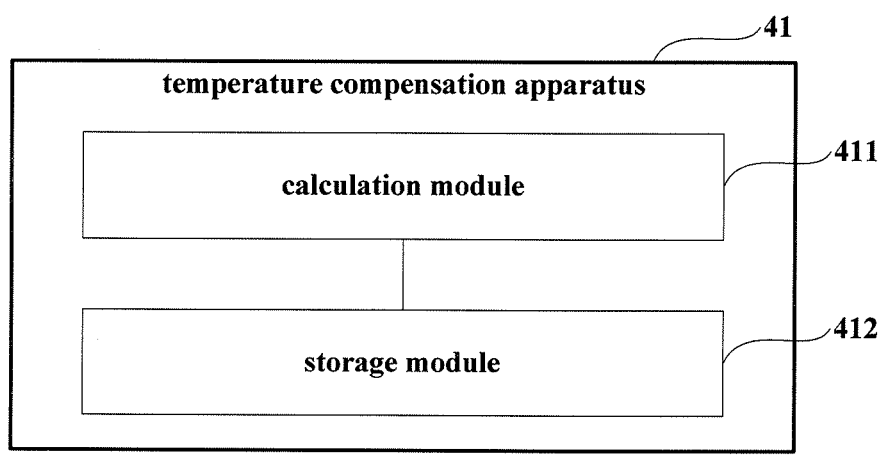
FIG. 4 is a schematic diagram of the composition of electronic equipment of an embodiment of the present invention.

An embodiment of the present invention further provides electronic equipment. FIG. 4 is a schematic diagram of the composition of the electronic equipment, which uses an RSSI signal for signal power measurement. Referring to FIG. 4, besides the original compositions and functions, the electronic equipment further comprises a temperature compensation apparatus 41 configured to perform temperature compensation on RSSI input signals in measuring the signal power of the electronic equipment.

In this embodiment, the temperature compensation apparatus 41 comprises a calculation module 411 configured to calculate temperature compensation coefficients and a storage module 412 configured to store the temperature compensation coefficients, and may be realized by the temperature compensation apparatus of Embodiment 1, the contents of which being incorporated herein, which shall not be described herein any further.

The electronic equipment of this embodiment uses the temperature compensation apparatus of Embodiment 1 to perform temperature compensation on RSSI input signals, which obtains accurate power values of the input signals of the RSSI under any temperatures by measuring the characteristics of the RSSI under the predefined three temperatures, and using an interpolation method to compensate for the temperature characteristics of the RSSI. In comparison with the relevant art, the size of the storage is decreased and the accuracy of temperature compensation is improved.

Embodiment 3

Figure 5:
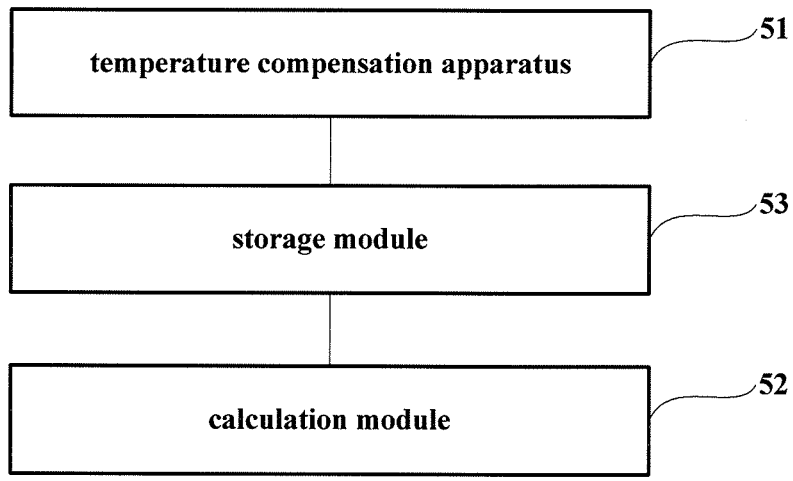
FIG. 5 is a schematic diagram of the composition of electronic equipment of another embodiment of the present invention.

An embodiment of the present invention further provides electronic equipment. FIG. 5 is a schematic diagram of the composition of the electronic equipment, which uses an RSSI signal for signal power measurement. Referring to FIG. 5, besides the original compositions and functions, the electronic equipment further comprises a temperature compensation apparatus 51, a calculation module 52 and a storage module 53.

In this embodiment, the temperature compensation apparatus 51 is configured to perform temperature compensation on RSSI input signals in measuring signal power of the electronic equipment, and may be realized by the temperature compensation apparatus shown in FIG. 2, the contents of which being incorporated herein, which shall not be described herein any further.

In this embodiment, the calculation module 52 is configured to calculate the normal temperature coefficients, the low temperature coefficients, and the high temperature coefficients, and may be realized by the calculation module of Embodiment 1, the contents of which being incorporated herein, which shall not be described herein any further.

In this embodiment, the storage module 53 is configured to store the temperature compensation coefficients calculated by the calculation module 52, for use by the temperature compensation apparatus 51 in selecting temperature compensation coefficients, and may be realized by the storage 32 of Embodiment 1, the contents of which being incorporated herein, which shall not be described herein any further.

The electronic equipment of this embodiment uses the temperature compensation apparatus of FIG. 1 to perform temperature compensation on RSSI input signals, which obtains accurate power values of the input signals of the RSSI under any temperatures by measuring the characteristics of the RSSI under the predefined three temperatures, and using an interpolation method to compensate for the temperature characteristics of the RSSI. In comparison with the relevant art, the size of the storage is decreased and the accuracy of temperature compensation is improved.

An embodiment of the present invention further provides an RSSI temperature compensation method, as described in Embodiment 4 below. As the principle of the method for solving problems is similar to that of the RSSI temperature compensation apparatus of Embodiment 1, the implementation of Embodiment 1 may be referred to for the implementation of the method, and the repeated parts shall not be described any further.

Embodiment 4

Figure 6:
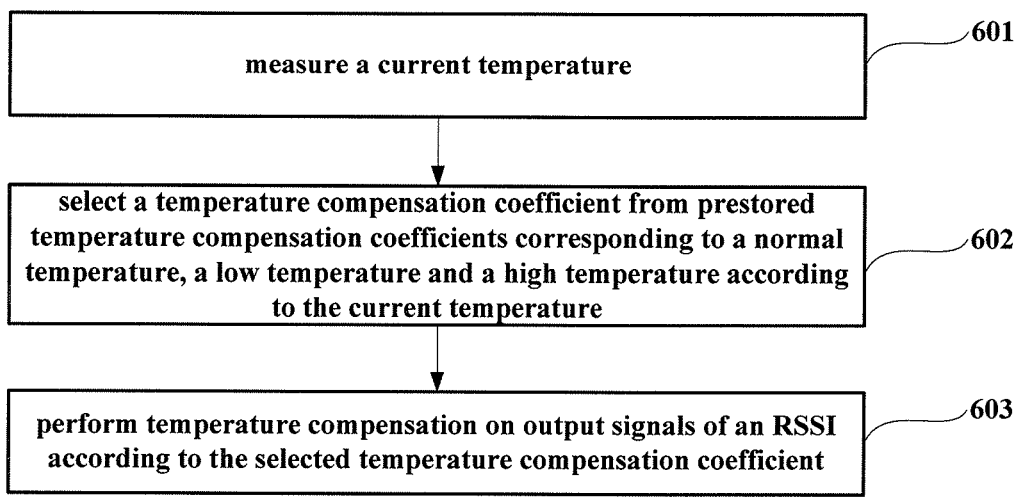
FIG. 6 is a flowchart of a temperature compensation method of an embodiment of the present invention.

An embodiment of the present invention further provides a temperature compensation method. FIG. 6 is a flowchart of the method. Referring to FIG. 6, the method comprises:

step 601: measuring a current temperature;

step 602: selecting a temperature compensation coefficient from prestored temperature compensation coefficients corresponding to a normal temperature, a low temperature and a high temperature according to the current temperature; and step 603: performing temperature compensation on output signals of an RSSI according to the selected temperature compensation coefficient, thereby obtaining power of input signals of the RSSI.

In step 602, when the current temperature is lower than the normal temperature, the low temperature coefficient is selected as the temperature compensation coefficient; and when the current temperature is higher than or equal to the normal temperature, the high temperature coefficient is selected as the temperature compensation coefficient.

In step 603, an inverse RSSI characteristic difference may be calculated first according to the selected temperature compensation coefficient and the output signals of the RSSI, and then inverse RSSI characteristics may be calculated according to the inverse RSSI characteristic difference, the output signals of the RSSI and a normal temperature coefficient, thereby obtaining the power of the input signals of the RSSI.

In step 603, if the low temperature coefficient is selected as the temperature compensation coefficient, the inverse RSSI characteristic difference g(x) may be calculated according to the formula below: $g(x)=(t-t0)*(bl0+bl1*x+bl2*x^2+\ldots)$.

In step 603, if the high temperature coefficient is selected as the temperature compensation coefficient, the inverse RSSI characteristic difference g(x) may be calculated according to the formula below: $g(x)=(t-t0)*(bh0+bh1*x+bh2*x^2+\ldots)$.

In the formulae above, t is the current temperature, t0 is the predefined normal temperature, bl0, bl1, bl2 . . . are the low temperature coefficients to which the predefined low temperature t1 corresponds, bh0, bh1, bh2 . . . are the high temperature coefficients to which the predefined high temperature th corresponds, and x is the output signal of the RSSI.

In step 603, the inverse RSSI characteristics may be calculated according to the formula below:

$$f(x+g(x))=a0+a1*(x+g(x))+a2*(x+g(x))^2+\ldots;$$

where, a0, a1, a2 . . . are normal temperature coefficients to which the normal temperature t0 corresponds, x is the output signal of the RSSI, and g(x) is the inverse RSSI characteristic difference.

Figure 7:
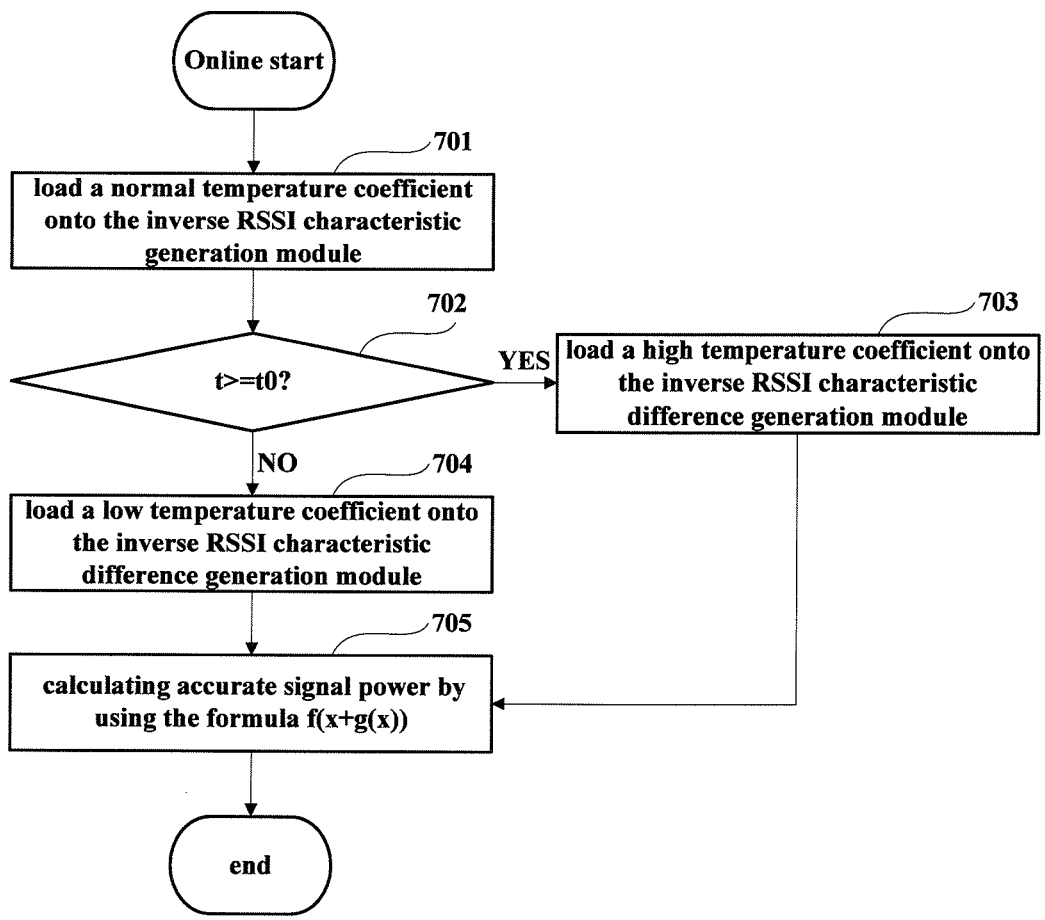
FIG. 7 is an operational flowchart of the temperature compensation method of the embodiment of the present invention.

For clarity and easy understanding of the temperature compensation method shown in FIG. 6 (corresponding to the temperature compensation module shown in FIG. 2), the method shall be described in detail with reference to the operational flowchart shown in FIG. 7. Referring to FIG. 7, the operational flow comprises:

step 701: loading a normal temperature coefficient onto the inverse RSSI characteristic generation module;

step 702: judging whether the current temperature is greater than or equal to the normal temperature, and executing step 703 if yes; otherwise, executing step 704;

step 703: loading a high temperature coefficient onto the inverse RSSI characteristic difference generation module;

step 704: loading a low temperature coefficient onto the inverse RSSI characteristic difference generation module; and step 705: calculating accurate signal power by using the formula f(x+g(x)).

Figure 8:
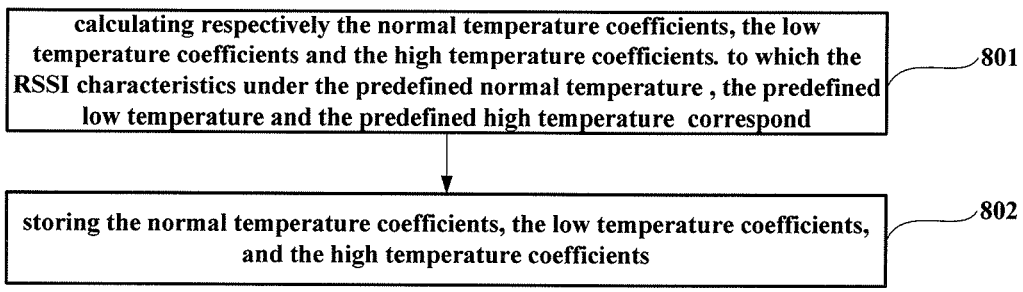
FIG. 8 is a flowchart of a method for calculating a temperature compensation coefficient of an embodiment of the present invention.

In this embodiment, the normal temperature coefficient, the low temperature coefficient and the high temperature coefficient may be calculated by using the method shown in FIG. 8. Referring to FIG. 8, the method comprises:

step 801: calculating respectively the normal temperature coefficients a0, a1, a2 . . . , the low temperature coefficients bl0, bl1, bl2 . . . and the high temperature coefficients bh0, bh1, bh2 . . . to which the RSSI characteristics under the predefined normal temperature t0, the predefined low temperature a and the predefined high temperature th correspond; and step 802: storing the normal temperature coefficients a0, a1, a2 . . . , the low temperature coefficients bl0, bl1, bl2 . . . , and the high temperature coefficients bh0, bh1, bh2 . . . .

In step 801, the RSSI characteristics under the normal temperature t0, the low temperature t1 and the high temperature th may be measured and the RSSI characteristics under different temperatures are inversed first, and then the inverse RSSI characteristics under the normal temperature t0 is performed polynomial fitting, so as to obtain the normal temperature coefficients a0, a1, a2 . . . to which the RSSI characteristics under the normal temperature correspond, the difference between the inverse RSSI characteristics under the normal temperature t0 and the inverse RSSI characteristics under the high temperature th is performed polynomial fitting, so as to obtain the high temperature coefficients bh0, bh1, bh2 . . . to which the RSSI characteristics under the high temperature correspond, and the difference between the inverse RSSI characteristics under the normal temperature t0 and the inverse RSSI characteristics under the low temperature t1 is performed polynomial fitting, so as to obtain the low temperature coefficients bl0, bl1, bl2 . . . to which the RSSI characteristics under the low temperature correspond.

Figure 9:
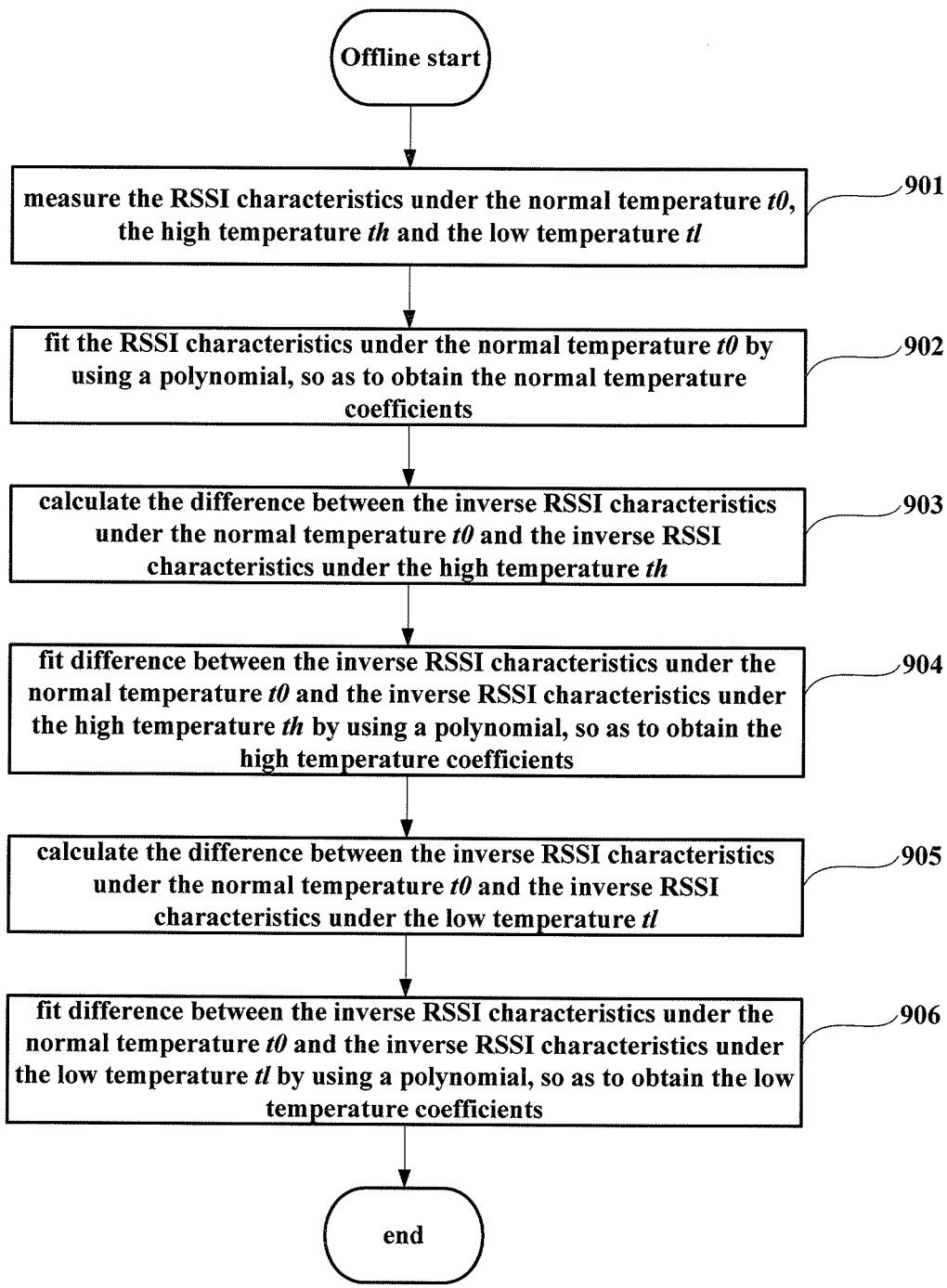
FIG. 9 is an operational flowchart for calculating a temperature compensation coefficient of the embodiment of the present invention.

For clarity and easy understanding of the method shown in FIG. 8 (corresponding to the compensation module shown in FIG. 3), the method shall be described in detail with reference to the operational flowchart shown in FIG. 9. Referring to FIG. 9, the operational flow comprises:

step 901: measuring the RSSI characteristics under the normal temperature t0, the high temperature th and the low temperature t1;

step 902: fitting the RSSI characteristics under the normal temperature t0 by using a polynomial, so as to obtain the normal temperature coefficients;

step 903: calculating the difference between the inverse RSSI characteristics under the normal temperature t0 and the inverse RSSI characteristics under the high temperature th;

step 904: fitting difference between the inverse RSSI characteristics under the normal temperature t0 and the inverse RSSI characteristics under the high temperature th by using a polynomial, so as to obtain the high temperature coefficients;

step 905: calculating the difference between the inverse RSSI characteristics under the normal temperature t0 and the inverse RSSI characteristics under the low temperature t1;

step 906: fitting difference between the inverse RSSI characteristics under the normal temperature t0 and the inverse RSSI characteristics under the low temperature t1 by using a polynomial, so as to obtain the low temperature coefficients.

With the temperature compensation method of the embodiment of the present invention, accurate power values of the input signals of the RSSI under any temperatures are obtained by measuring the characteristics of the RSSI under the predefined three temperatures, and using an interpolation method to compensate for the temperature characteristics of the RSSI. In comparison with the relevant art, the size of the storage is decreased and the accuracy of temperature compensation is improved.

The preferred embodiments of the present invention are described above with reference to the drawings. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

It should be understood that each of the parts of the present invention may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

The description or blocks in the flowcharts or of any process or method in other manners may be understood as being indicative of comprising one or more modules, segments or parts for realizing the codes of executable instructions of the steps in specific logic functions or processes, and that the scope of the preferred embodiments of the present invention comprise other implementations, wherein the functions may be executed in manners different from those shown or discussed, including executing the functions according to the related functions in a substantially simultaneous manner or in a reverse order, which should be understood by those skilled in the art to which the present invention pertains.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a system including a computer, a system including a processor, or other systems capable of extracting instructions from an instruction executing system, device or apparatus and executing the instructions), or for use in combination with the instruction executing system, device or apparatus. As used herein, "a computer readable medium" can be any device that can contain, store, communicate with, propagate or transmit programs for use by an instruction executing system, device or apparatus, or can be used with the instruction executing system, device or apparatus. A computer readable medium may be, for example, but not limited to, a magnetic, optical, electromagnetic, infrared or semiconductor system, device, apparatus, or a propagation medium. More particular examples (inexhaustive lists) of a computer readable medium may comprise the following: an electrical connecting portion (electronic device) having one or more wirings, a portable computer hardware box (magnetic device), a random access memory (RAM) (electronic device), a read-only memory (ROM) (electronic device), an erasable programmable read-only memory (EPROM or flash memory) (electronic device), an optical fiber (optical device), and a portable compact disk read-only memory (CDROM) (optical device). Furthermore, a computer readable medium may be paper or other appropriate media on which the programs may be printed, as the programs may be obtained electronically through scanning optically the paper or other appropriate media and then compiling, interpreting, or processing in other appropriate manners, as necessary, and then the programs are stored in the computer memory.

The above literal description and drawings show various features of the present invention. It should be understood that a person of ordinary skill in the art may prepare suitable computer codes to carry out each of the steps and processes described above and illustrated in the drawings. It should also be understood that the above-described terminals, computers, servers, and networks, etc. may be any type, and the computer codes may be prepared according to the disclosure contained herein to carry out the present invention by using the devices.

Particular embodiments of the present invention have been disclosed herein. Those skilled in the art will readily recognize that the present invention is applicable in other environments. In practice, there exist many embodiments and implementations. The appended claims are by no means intended to limit the scope of the present invention to the above particular embodiments. Furthermore, any reference to "a device to . . . " is an explanation of device plus function for describing elements and claims, and it is not desired that any element using no reference to "a device to . . . " is understood as an element of device plus function, even though the wording of "device" is included in that claim.

Although a particular preferred embodiment or embodiments have been shown and the present invention has been described, it is obvious that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present invention with respect to structure. Furthermore, although the a particular feature of the present invention is described with respect to only one or more of the illustrated embodiments, such a feature may be combined with one or more other features of other embodiments as desired and in consideration of advantageous aspects of any given or particular application.

For the implementation of the present invention containing the above embodiments, following supplements are further disclosed.

Supplement 1. A temperature compensation apparatus for a Received Signal Strength Indicator (RSSI), comprising:
a temperature sensor configured to measure a current temperature; and
a digital compensation module configured to select a temperature compensation coefficient from prestored temperature compensation coefficients corresponding to a normal temperature, a low temperature and a high temperature according to the current temperature, and perform temperature compensation on output signals of the RSSI according to the selected temperature compensation coefficient, so as to obtain accurate power of input signals of the RSSI.

Supplement 2. The apparatus according to supplement 1, wherein the digital compensation module comprises:
a comparator configured to compare the current temperature with a predefined normal temperature;
a selector configured to select a high temperature coefficient or a low temperature coefficient as the temperature compensation coefficient according to the comparison result of the comparator;
an inverse RSSI characteristic difference generation module configured to calculate an inverse RSSI characteristic difference according to the selected temperature compensation coefficient and the output signals of the RSSI; and
an inverse RSSI characteristic generation module configured to calculate inverse RSSI characteristics according to the inverse RSSI characteristic difference, the output signals of the RSSI and a normal temperature coefficient.

Supplement 3. The apparatus according to supplement 2, wherein the selector selects the low temperature coefficient as the temperature compensation coefficient when the comparison result of the comparator is that the current temperature is less than the normal temperature, and selects the high temperature coefficient as the temperature compensation coefficient when the comparison result of the comparator is that the current temperature is greater than the normal temperature.

Supplement 4. The apparatus according to supplement 2, wherein,
if the current temperature is less than the normal temperature, the inverse RSSI characteristic difference generation module calculates the inverse RSSI characteristic difference $g(x)$ according to the following formula:

$$g(x)=(t-t0)*(bl0+bl1*x+bl2*x^2+\ldots);$$

and if the current temperature is greater than the normal temperature, the inverse RSSI characteristic difference generation module calculates the inverse RSSI characteristic difference g(x) according to the following formula:

$$g(x)=(t-t0)*(bh0+bh1*x+bh2*x^2+\ldots);$$

where, t is the current temperature, t0 is the predefined normal temperature, bl0, bl1, bl2 . . . are low temperature coefficients to which the predefined low temperature t1 corresponds, bh0, bh1, bh2 . . . are high temperature coefficients to which the predefined high temperature th corresponds, and x is an output signal of the RSSI.

Supplement 5. The apparatus according to supplement 2, wherein the inverse RSSI characteristic generation module calculates the inverse RSSI characteristics according to the following formula:

$$f(x+g(x))=a0+a1*(x+g(x))+a2*(x+g(x))^2+\ldots$$

where, a0, a1, a2 . . . are normal temperature coefficients to which the normal temperature t0 corresponds, x is an output signal of the RSSI, and g(x) is the inverse RSSI characteristic difference.

Supplement 6. The apparatus according to supplement 2, wherein the temperature compensation apparatus further comprises:

a calculation module configured to respectively calculate the normal temperature coefficients a0, a1, a2 . . . to which the RSSI characteristics under the predefined normal temperature t0 correspond, the low temperature coefficients bl0, bl1, bl2 . . . to which the RSSI characteristics under the predefined low temperature t1 correspond, and the high temperature coefficients bh0, bh1, bh2 . . . to which the RSSI characteristics under the predefined high temperature th correspond; and a storage module configured to store the normal temperature coefficients a0, a1, a2 . . . , the low temperature coefficients bl0, bl1, bl2 . . . , and the high temperature coefficients bh0, bh1, bh2 . . . .

Supplement 7. The apparatus according to supplement 6, wherein the calculation module comprises:

a measurement module configured to respectively measure the RSSI characteristics under the normal temperature t0, the low temperature t1 and the high temperature th;

an inverse-taking module configured to take inverse of the RSSI characteristics under the normal temperature, the low temperature and the high temperature;

a first calculation module configured to perform polynomial fitting to the inverse RSSI characteristics under the normal temperature t0, so as to obtain the normal temperature coefficients a0, a1, a2 . . . to which the RSSI characteristics under the normal temperature correspond;

a second calculation module configured to perform polynomial fitting to the difference between the inverse RSSI characteristics under the normal temperature t0 and the high temperature th, so as to obtain the high temperature coefficients bh0, bh1, bh2 . . . to which the RSSI characteristics under the high temperature correspond; and a third calculation module configured to perform polynomial fitting to the difference between the inverse RSSI characteristics under the normal temperature t0 and the low temperature t1, so as to obtain the low temperature coefficients bl0, bl1, bl2 . . . to which the RSSI characteristics under the low temperature correspond.

Supplement 8. Electronic equipment, comprising the temperature compensation apparatus as described in any one of supplements 1, and temperature compensation being performed by the temperature compensation apparatus to output signals of an RSSI when the signal power of the electronic equipment is measured.

Supplement 9. A temperature compensation method for RSSI, comprising:

measuring a current temperature;

selecting a temperature compensation coefficient from pre-stored temperature compensation coefficients corresponding to a normal temperature, a low temperature and a high temperature according to the current temperature; and performing temperature compensation on output signals of the RSSI according to the selected temperature compensation coefficient, so as to obtain power of input signals of the RSSI.

Supplement 10. The method according to supplement 9, wherein the low temperature coefficient is selected as the temperature compensation coefficient when the current temperature is less than the normal temperature, and the high temperature coefficient is selected as the temperature compensation coefficient when the current temperature is greater than or equal to the normal temperature.

Supplement 11. The method according to supplement 9, wherein the step of performing temperature compensation on output signals of the RSSI according to the selected temperature compensation coefficient, so as to obtain power of input signals of the RSSI, comprises:

calculating an inverse RSSI characteristic difference according to the selected temperature compensation coefficient and the output signals of the RSSI; and calculating the power of input signals of the RSSI according to the inverse RSSI characteristic difference, the output signals of the RSSI and a normal temperature coefficient.

Supplement 12. The method according to supplement 11, wherein, if the selected temperature compensation coefficient is the low temperature coefficient, the inverse RSSI characteristic difference g(x) are calculated according to the following formula:

$$g(x)=(t-t0)*(bl0+bl1*x+bl2*x^2+\ldots);$$

and if the selected temperature compensation coefficient is the high temperature coefficient, the inverse RSSI characteristic difference g(x) are calculated according to the following formula:

$$g(x)=(t-t0)*(bh0+bh1*x+bh2*x^2+\ldots);$$

where, t is the current temperature, t0 is the predefined normal temperature, bl0, bl1, bl2 . . . are low temperature coefficients to which the predefined low temperature t1 corresponds, bh0, bh1, bh2 . . . are high temperature coefficients to which the predefined high temperature th corresponds, and x is an output signal of the RSSI.

Supplement 13. The method according to supplement 11, wherein the inverse RSSI characteristics are calculated according to the following formula:

$$f(x+g(x))=a0+a1*(x+g(x))+a2*(x+g(x))^2+\ldots$$

where, a0, a1, a2 . . . are normal temperature coefficients to which the normal temperature t0 corresponds, x is an output signal of the RSSI, and g(x) is the inverse RSSI characteristic difference.

Supplement 14. The method according to supplement 9, wherein the method further comprises:

calculating respectively the normal temperature coefficients a0, a1, a2 . . . to which the RSSI characteristics under the predefined normal temperature t0 correspond, the low temperature coefficients bl0, bl1, bl2 . . . to which the RSSI characteristics under the predefined low temperature t1 correspond, and the high temperature coefficients bh0, bh1, bh2 . . . to which the RSSI characteristics under the predefined high temperature th correspond; and storing the normal temperature coefficients a0, a1, a2 . . . , the low temperature coefficients bl0, bl1, bl2 . . . , and the high temperature coefficients bh0, bh1, bh2 . . . .

Supplement 15. The method according to supplement 14, wherein the step of calculating the temperature coefficients comprises:

measuring respectively the RSSI characteristics under the normal temperature t0, the low temperature t1 and the high temperature th;

taking inverse of the RSSI characteristics under the normal temperature, the low temperature and the high temperature;

performing polynomial fitting on the inverse RSSI characteristics under the normal temperature t0, so as to obtain the normal temperature coefficients a0, a1, a2 . . . to which the RSSI characteristics under the normal temperature correspond;

performing polynomial fitting on the difference between the inverse RSSI characteristics under the normal temperature t0 and the high temperature th, so as to obtain the high temperature coefficients bh0, bh1, bh2 . . . to which the RSSI characteristics under the high temperature correspond; and performing polynomial fitting on the difference between the inverse RSSI characteristics under the normal temperature t0 and the low temperature t1, so as to obtain the low temperature coefficients bl0, bl1, bl2 . . . to which the RSSI characteristics under the low temperature correspond.

The invention claimed is:

1. A temperature compensation apparatus for a Received Signal Strength Indicator (RSSI) configured to receive an input signal, the apparatus comprising:
   a temperature sensor configured to measure a current temperature; and
   a digital compensation module configured to select a temperature compensation coefficient from temperature compensation coefficients corresponding to a normal temperature, a low temperature and a high temperature, based on the current temperature, and perform temperature compensation on an output signal of the RSSI according to the selected temperature compensation coefficient, so as to produce a compensated power of the input signal.

2. The temperature compensation apparatus according to claim 1, wherein the digital compensation module comprises:
   a comparator configured to compare the current temperature with a predefined normal temperature;
   a selector configured to select a high temperature coefficient or a low temperature coefficient as the temperature compensation coefficient based on the comparison result of the comparator;
   an inverse RSSI characteristic difference generation module configured to calculate an inverse RSSI characteristic difference according to the selected temperature compensation coefficient and the output signal of the RSSI; and
   an inverse RSSI characteristic generation module configured to calculate inverse RSSI characteristics, as the compensated power of the input signal, based on the inverse RSSI characteristic difference, the output signal of the RSSI and a normal temperature coefficient.

3. The temperature compensation apparatus according to claim 2, wherein the selector is configured to select the low temperature coefficient as the temperature compensation coefficient when the current temperature is determined to be less than the predefined normal temperature, and select the high temperature coefficient as the temperature compensation coefficient when the current temperature is determined to be greater than or equal to the predefined normal temperature.

4. The temperature compensation apparatus according to claim 2, wherein:
   if the current temperature is determined to be less than the predefined normal temperature, the inverse RSSI characteristic difference generation module is configured to calculate an inverse RSSI characteristic difference $g(x)$ according to the following expression:

$$g(x)=(t-t0)*(bl0+bl1*x+bl2*x^2+\ldots); \text{ and}$$

if the current temperature is determined to be greater than or equal to the predefined normal temperature, the inverse RSSI characteristic difference generation module is configured to calculate the inverse RSSI characteristic difference $g(x)$ according to the following expression:

$$g(x)=(t-t0)*(bh0+bh1*x+bh2*x^2+\ldots);$$

where, $t$ is the current temperature, $t0$ is the predefined normal temperature, $bl0, bl1, bl2, \ldots$ are low temperature coefficients to which a predefined low temperature $t1$ corresponds, $bh0, bh1, bh2, \ldots$ are high temperature coefficients to which a predefined high temperature $th$ corresponds, and $x$ is the output signal of the RSSI.

5. The temperature compensation apparatus according to claim 2, wherein the inverse RSSI characteristic generation module is configured to calculate the inverse RSSI characteristics according to the following expression:

$$f(x+g(x))=a0+a1*(x+g(x))+a2*(x+g(x))^2+\ldots$$

where, $a0, a1, a2, \ldots$ are normal temperature coefficients to which the predefined normal temperature $t0$ corresponds, $x$ is the output signal of the RSSI, and $g(x)$ is the inverse RSSI characteristic difference.

6. The temperature compensation apparatus according to claim 2, further comprising:
   a calculation module configured to respectively calculate normal temperature coefficients $a0, a1, a2, \ldots$ to which RSSI characteristics under the predefined normal temperature $t0$ corresponds, low temperature coefficients $bl0, bl1, bl2, \ldots$ to which RSSI characteristics under a predefined low temperature $t1$ corresponds, and high temperature coefficients $bh0, bh1, bh2, \ldots$ to which RSSI characteristics under a predefined high temperature $th$ corresponds; and
   a storage module configured to store the normal temperature coefficients $a0, a1, a2, \ldots$, the low temperature coefficients $bl0, bl1, bl2, \ldots$, and the high temperature coefficients $bh0, bh1, bh2, \ldots$.

7. The temperature compensation apparatus according to claim 6, wherein the calculation module further comprises:
   a measurement module configured to respectively measure the RSSI characteristics under the predefined normal temperature $t0$, the predefined low temperature $t1$ and the predefined high temperature $th$;
   an inverse-taking module configured to take inverses of the RSSI characteristics under the predefined normal temperature, the predefined low temperature and the predefined high temperature;
   a first calculation module configured to perform a polynomial fitting on the inverse RSSI characteristics under the predefined normal temperature $t0$, so as to obtain the normal temperature coefficients $a0, a1, a2, \ldots$ to which the RSSI characteristics under the predefined normal temperature correspond;

a second calculation module configured to perform a polynomial fitting on a difference between the inverse RSSI characteristics under the predefined normal temperature t0 and the inverse RSSI characteristics under the predefined high temperature th, so as to obtain the high temperature coefficients bh0, bh1, bh2, . . . to which the RSSI characteristics under the predefined high temperature correspond; and a third calculation module configured to perform a polynomial fitting on a difference between the inverse RSSI characteristics under the predefined normal temperature t0 and the inverse RSSI characteristics under the predefined low temperature t1, so as to obtain the low temperature coefficients bl0, bl1, bl2, . . . to which the RSSI characteristics under the predefined low temperature correspond.

8. The temperature compensation apparatus according to claim 2, wherein the normal temperature coefficient comprises a plurality of coefficients to which the predefined normal temperature corresponds.

9. Electronic equipment for power measurement, comprising the temperature compensation apparatus as claimed in claim 1, and the temperature compensation being performed by the temperature compensation apparatus on the output signal of the RSSI when signal power of the electronic equipment is measured.

10. The temperature compensation apparatus according to claim 1, wherein the temperature compensation coefficients are stored in a storage module coupled to the digital compensation module.

11. The temperature compensation apparatus according to claim 10, wherein the temperature compensation coefficients comprise a plurality of high temperature coefficients and a plurality of low temperature coefficients, the high temperature coefficients being coefficients to which a predefined high temperature corresponds and the low temperature coefficients being coefficients to which a predefined low temperature corresponds.

12. A temperature compensation method for a Received Signal Strength Indicator (RSSI) configured to receive an input signal, the method comprising:
measuring a current temperature;
selecting a temperature compensation coefficient from temperature compensation coefficients corresponding to a normal temperature, a low temperature and a high temperature, based on the current temperature; and
performing temperature compensation on an output signal of the RSSI based on the selected temperature compensation coefficient, so as to produce a compensated power of the input signal.

13. The temperature compensation method according claim 12, further comprising:
calculating an inverse RSSI characteristic difference based on the selected temperature compensation coefficient and the output signal of the RSSI; and
calculating inverse RSSI characteristics, as the compensated power of the input signal, based on the inverse RSSI characteristic difference, the output signal of the RSSI, and a normal temperature coefficient.

14. The temperature compensation method according to claim 12, further comprising:
selecting a low temperature coefficient as the temperature compensation coefficient when the current temperature is less than a predefined normal temperature; or
selecting a high temperature coefficient as the temperature compensation coefficient when the current temperature is greater than or equal to the predefined normal temperature.

15. The temperature compensation method according to claim 14, wherein:
the predefined normal temperature coefficient comprises a plurality of coefficients to which the predefined normal temperature corresponds; and
the selected temperature compensation coefficient comprises a plurality of low temperature coefficients or a plurality of high temperature coefficients, the low temperature coefficients being coefficients to which a predefined low temperature corresponds and the high temperature coefficients being coefficients to which a predefined high temperature corresponds.

16. An apparatus to be implemented in a temperature compensation device for a Received Signal Strength Indicator (RSSI) configured to receive an input signal, the apparatus comprising:
a digital compensation module configured to:
select a temperature compensation coefficient from temperature compensation coefficients corresponding to a low temperature or a high temperature, based on a current temperature measured by a temperature sensor; and
perform temperature compensation on an output signal of the RSSI according to the selected temperature compensation coefficient to produce a compensated power of the input signal.

17. The apparatus according to claim 16, wherein the digital compensation module comprises:
a comparator configured to compare the current temperature with a predefined normal temperature; and
a selector configured to select a high temperature coefficient or a low temperature coefficient as the temperature compensation coefficient, based on the comparison result of the comparator.

18. The apparatus according to claim 17, wherein the digital compensation module further comprises:
an inverse RSSI characteristic different generation module configured to determine an inverse RSSI characteristic difference based on the selected temperature compensation coefficient and the output signal of the RSSI; and
an inverse RSSI characteristic generation module configured to determine inverse RSSI characteristics as a compensated power of the input signal, based on the inverse RSSI characteristic difference, the output signal of the RSSI, and a normal temperature coefficient.

19. The apparatus according to claim 18, wherein:
the normal temperature coefficient comprises a plurality of coefficients to which the predefined normal temperature corresponds; and
the high temperature coefficient comprises a plurality of high temperature coefficients, and the low temperature coefficient comprises a plurality of low temperature coefficients, the high temperature coefficients being coefficients to which a predefined high temperature corresponds and the low temperature coefficients being coefficients to which a predefined low temperature corresponds.

* * * * *